UNITED STATES PATENT OFFICE.

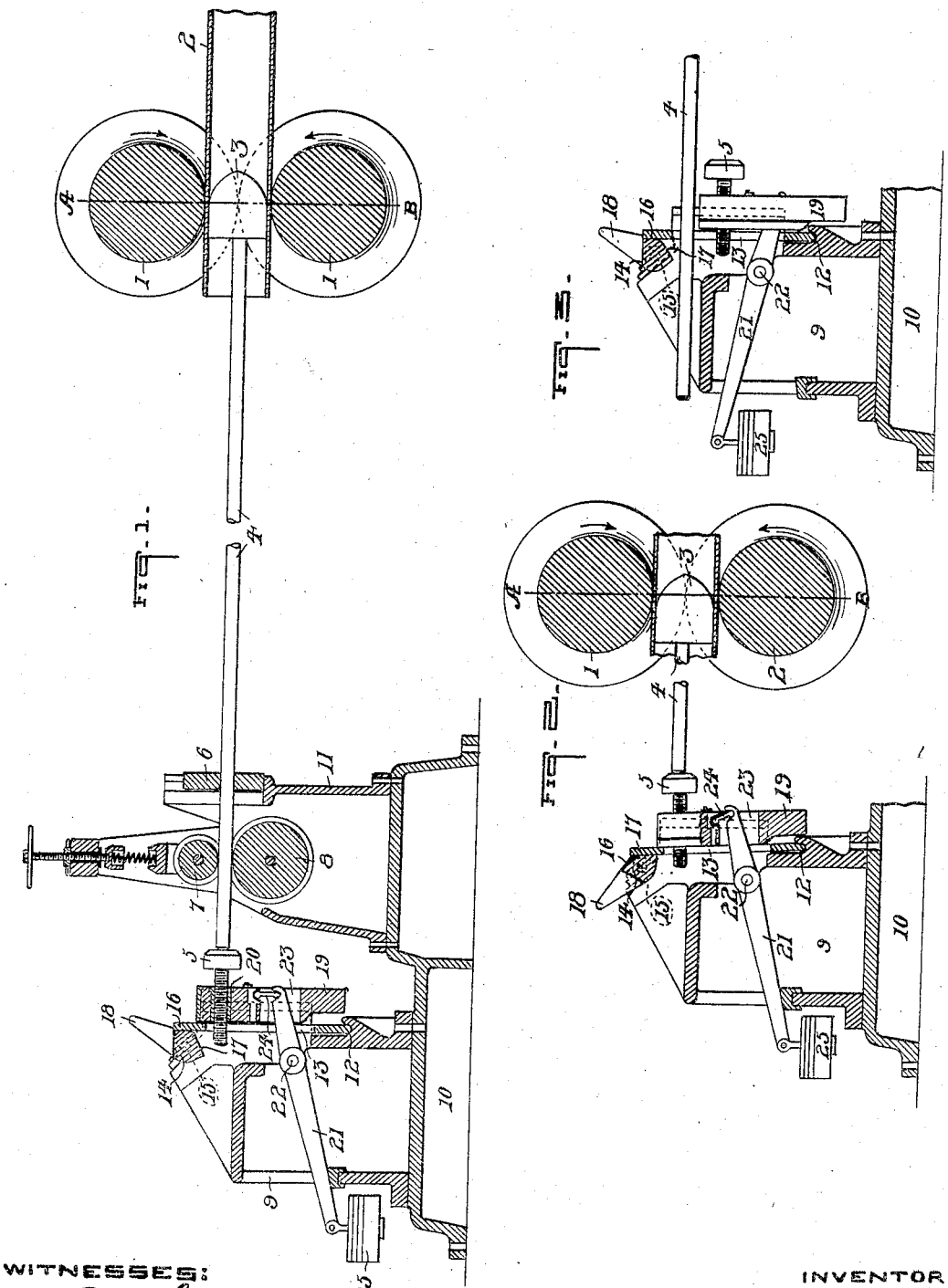

HENRY W. HOCK, OF YOUNGSTOWN, OHIO, ASSIGNOR TO THE YOUNGSTOWN SHEET AND TUBE COMPANY, OF YOUNGSTOWN, OHIO, A CORPORATION OF OHIO.

METHOD AND APPARATUS FOR MAKING TUBES.

No. 896,991.     Specification of Letters Patent.     Patented Aug. 25, 1908.

Application filed April 2, 1908. Serial No. 424,847.

*To all whom it may concern:*

Be it known that I, HENRY W. HOCK, a citizen of the United States, residing at Youngstown, in the county of Mahoning and State of Ohio, have invented or discovered new and useful Improvements in Methods and Apparatus for Making Tubes, of which the following is a specification.

My invention relates to processes and apparatus for making lap-weld pipes.

In the operation of welding pipes, the skelp sometimes becomes stuck in the welding rolls, causing delays which result in the skelp becoming too cool to make a good weld and in the interruption of the work of several men and regular operation of the mill. I have devised means for causing the mandrel and pipe-ball to drop back slightly so as to give the welding rolls a new grip on the skelp whenever the skelp becomes stuck in the roll-pass.

Many means may be devised for accomplishing the object of my invention, but I prefer the mechanism illustrated on the accompanying sheet of drawings which forms a part of this specification and in which—

Figure 1 is a vertical section taken in the plane of the axis of the tubular skelp, the mandrel and the pipe-ball being in side elevation and the mandrel being broken away. Fig. 2 is a view like Fig. 1 but showing the mandrel stop, the mandrel and the pipe-ball in their rear position. Fig. 3 is a vertical section of the stop-stand with the stop lowered to allow the mandrel-bar to pass.

On the drawings, I show a pair of welding rolls 1 in the act of welding the tubular skelp 2.

3 is the usual pipe-ball which is held within the skelp 2 by the mandrel-bar 4, having its rear end seated against the head of the screw 5 in the stop-stand. The mandrel-bar 4 passes through the guide 6 and between the rolls 7 and 8 which constitute the bar-puller.

The stop-stand consists of a hollow casting 9 seated on the base 10, which also supports the housing 11 for the bar-puller. The front of the stop-stand has the rocker-seat 12, in which the bottom of the rocker-plate or stop-block carrier 13 rests. The upper end of the rocker-plate rests against one of the faces of the roller cam 14 journaled in the top of the casting 9. The cam lies transversely of the length of the mandrel-bar 4 and has two faces parallel with the axis 15 of rotation of the cam, one face 16 being further from the said axis than the other face 17. The cam 14 may be rocked by the handle 18 to bring the face 16 or 17 into contact with the rear face of the rocker plate 13. The stop-block 19 is slidable vertically on the front of the rocker-bar 13. It contains the threaded bushing 20 in which the stop-screw 5 works. The lever 21 is fulcrumed on the horizontal pivot 22, its forward end extending through the plate 13 and into the slot 23 in the stop-block 19. The rocking link 24 is seated in a notch in the upper side of the lever 21 and in the upper wall of the slot 23, so that the block 19 may swing with the plate 13 while the lever remains stationary. The rear end of the lever 21 is provided with the weights 25 which tend to hold the block 19 in its upper position, shown in Figs. 1 and 2. The block 19 may be moved in any desired manner to cause it to take its lower position shown on Fig. 3.

During the welding operation the parts will normally be as shown in Fig. 1, the screw 5 being adjusted so as to make the pipe-ball take the position with reference to the center line A—B of rolls. In case the skelp 2 becomes stuck in the welding rolls 1, the handle 18 is knocked to the rear so as to bring the face 17 of the cam 14 against the rocker plate 13. As the face 17 is nearer the axis of rotation of the cam 14 than the face 16, against which the plate 13 was previously resting, the rolls immediately push the pipe-ball 3, the mandrel-bar 4, the screw 5, and the upper ends of the block 19 and the plate 13 to the rear slightly (Fig. 2), which makes the work of the rolls much easier and causes them to push the skelp over the pipe-ball and mandrel-bar. By moving the lever 18 in the reverse direction, the pipe-ball will be brought forward again to its normal position as shown in Fig. 1. Fig. 2 shows the position of the pipe-ball with reference to the line A—B, when the lever 18 has been thrown to the rear.

The cam 14 may be rocked by various means other than the lever 18; the cam 14 may be replaced by other devices accomplishing its purpose; and the plate 13 may be mounted and operated in other ways than shown.

I claim—

1. The process of making pipe which consists in passing a blank through a roll-pass and over a mandrel in the roll-pass, and moving the mandrel in the direction of the feed of the blank to relieve the pressure on the blank when the latter becomes impeded in the roll-pass.

2. In a welding apparatus, a set of welding rolls, a pipe-ball, a mandrel bar, a stop carrier movable longitudinally of the mandrel bar, a stop-block supported by said carrier and arranged in line with said mandrel-bar, and means for moving the stop out of line with the mandrel-bar.

Signed at Pittsburg, Penna., this 26th day of March, A. D. 1908.

HENRY W. HOCK.

Witnesses:
 ALICE E. DUFF,
 F. N. BARBER.